S. BOAL.
COOKING STOVE.
No. 11,462. Reissued Jan. 8, 1895.
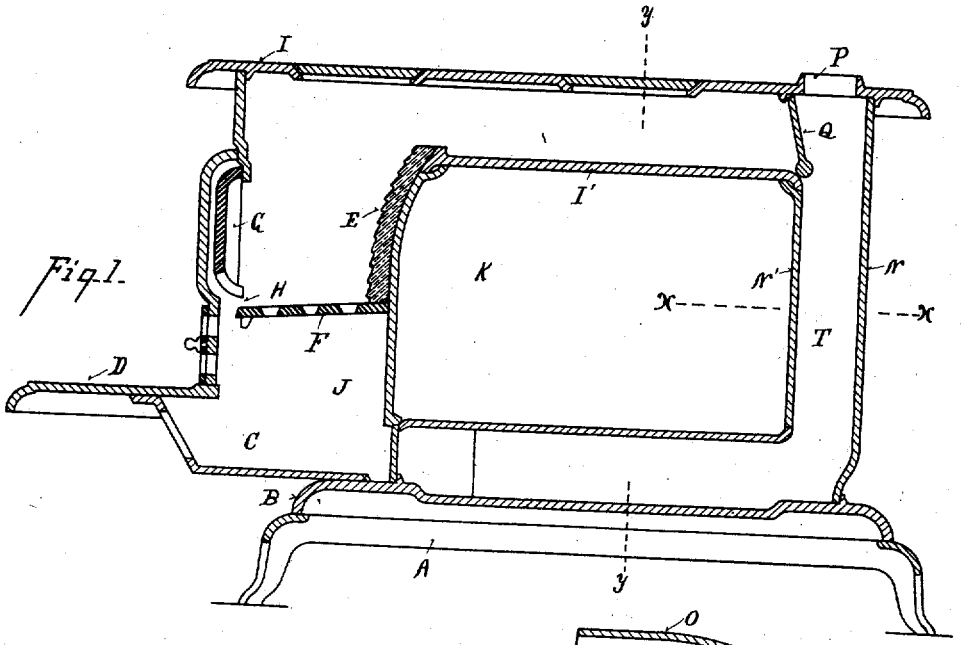
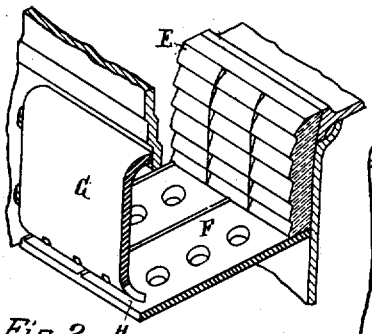
Fig. 2.
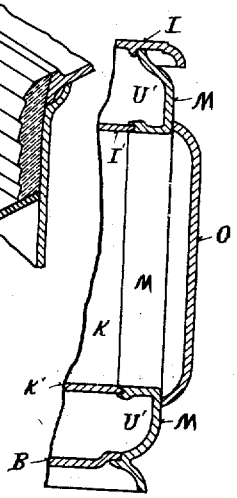
Fig. 4.
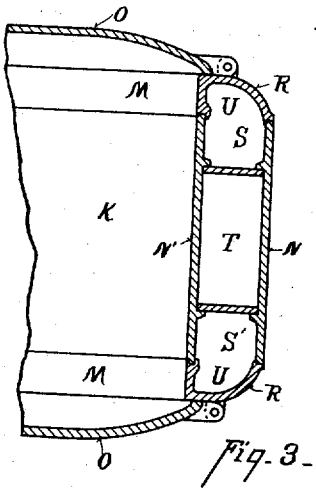
Fig. 3.
Witnesses
C. W. Miles
Oliver B. Kaiser
Inventor
Stanhope Boal
By Wood & Bond
Attorneys
THE NORRIS PETERS CO., PHOTO-LITH., WASHINGTON, D. C.

UNITED STATES PATENT OFFICE.

STANHOPE BOAL, OF PIQUA, OHIO.

COOKING-STOVE.

SPECIFICATION forming part of Reissued Letters Patent No 11,462, dated January 8, 1895.

Original No. 527,382, dated October 9, 1894. Application for reissue filed November 8, 1894. Serial No. 528,269.

*To all whom it may concern:*

Be it known that I, STANHOPE BOAL, a citizen of the United States, residing at Piqua, in the county of Miami and State of Ohio, have invented new and useful Improvements in Cooking-Stoves, of which the following is a specification.

The object of my invention is to provide a cooking stove with a curved or swelling form of side plates to which the oven doors are hinged so as to increase the capacity of the flues and also to increase the capacity of the oven and at the same time adding a beautiful appearance to the stove without increasing the cost.

The features of my invention will be more fully set forth in the description of the accompanying drawings making a part of this specification, in which—

Figure 1, is a central vertical longitudinal section of my improved cook stove. Fig. 2, is a central perspective view of the fire box. Fig. 3, is a section on line *x*, *x*, Fig. 1. Fig. 4, is a section on line *y*, *y*, Fig. 1.

A represents the base frame of the stove.

B represents the lower plate.

C represents the ash pit detachably supported upon the plate B.

D represents the sliding hearth over the ash pit C.

The fire box is composed of the back E, perforated fire bottom F, front door fender G. ash chute J, and air space H.

I represents the top plate of the stove.

I′ represents the top oven plate.

Between the plates I, I′, is formed the ordinary flue.

N represents the back plate of the stove. N′ represents the back plate of the oven. Between these plates is formed the down flues S, S′, for the products of combustion to pass under the oven, these flues being extended under the oven for this purpose.

T represents the up-flue which carries off the products of combustion. P represents the up take flue or pipe collar. Q represents the damper for opening and closing the flue T. These flues are constructed in the ordinary manner.

M represents the side plates of the stove. The upper edge is projected outward from the plate I′ to the point where the oven door abuts against the same and then extends upward to the plate I preferably curving inward so as to be of swelling form. The lower edge of the plate projects in the same manner from the bottom of the oven plate K′ and is curved down to the base frame B as shown in Fig. 4. R represents the curved sections of the said plates at their rear ends the inner edges of which are curved inward and abut the back plate N thus forming the pockets U and extending the down flues S, S′. The outcurving of these plates at the upper and lower edges forms the extensions U′ above and below the oven corresponding to the extensions of the side rear flues. By this construction I increase the size of the oven all the way around where the oven doors mount to the sides one inch more or less, without increasing the cost of making these sides or the cost of making the stoves. This is accomplished preferably by the curved form. One part of the pockets referred to above extends perpendicularly on the side directly opposite the descending or back corner flues S, S′, and therefore increases the size of these flues. These pockets increasing the size of these flues swell up flush with the oven doors and may be covered in one design with the oven doors, thus adding beauty to the appearance of the stove at the places referred to and increasing in appearance the length of the oven door.

Another important advantage obtained by the out-curved or out-flared form of plates is that they are much less likely to crack in cooling than as made heretofore.

It will be observed that the extension of the side plates inward from the oven door opening abuts the oven plates and forms an extension of the oven in said plates. It will also be observed that the curved portion of said side plates abuts the main back, top and bottom plates and that the pockets are formed by both of said extensions of the side plates.

I claim—

1. The combination with a cook stove having the usual draft flues and oven, and provided with two plates forming a flue at the rear of the oven, of a curved side plate M joined to the aforesaid flue plates and forming an extension of the rear flue, substantially as specified.

2. The combination with a cook stove having an oven and draft flues extending about said oven and down at the rear thereof at each side, of curved plates M forming extensions of the said rear flues, substantially as specified.

3. The combination of a cook stove having an oven and draft flues extending about said oven and downward at the rear thereof and at each side, of the curved plates M forming extensions U′ at the top and bottom of the oven, substantially as specified.

4. The combination with a cook stove having an oven and draft flues extending about said oven, of the curved side plates M, R, forming extensions at the sides and rear thereof, substantially as specified.

STANHOPE BOAL.

Witnesses:
WM. MCMEEKAN,
CHAS. C. JELLEFF.